US005675566A

United States Patent [19]
Kosaka et al.

[11] Patent Number: 5,675,566
[45] Date of Patent: Oct. 7, 1997

[54] RECORDING AND/OR REPRODUCING APPARATUS AND A CARTRIDGE FOR A RECORDING MEDIUM

[75] Inventors: Katsuki Kosaka; Yukihiko Tsujino, both of Kanagawa, Japan

[73] Assignee: Sony Corporation, Tokyo, Japan

[21] Appl. No.: 550,303

[22] Filed: Oct. 30, 1995

[30] Foreign Application Priority Data

Oct. 31, 1994 [JP] Japan .................... 6-267831

[51] Int. Cl.⁶ .................................... G11B 17/04
[52] U.S. Cl. .................................... 369/77.1; 369/77.2
[58] Field of Search .................... 369/75.1, 75.2, 369/77.1, 77.2, 289, 290, 291; 360/132, 133, 96.5, 99.02, 99.06, 99.07, 99.03

[56] References Cited

U.S. PATENT DOCUMENTS

| | | | |
|---|---|---|---|
| 4,608,681 | 8/1986 | Shiosaki | 369/77.2 |
| 4,777,631 | 10/1988 | Kamoshita et al. | 369/77.2 |
| 5,164,935 | 11/1992 | Shimegi et al. | 369/77.2 |
| 5,240,200 | 8/1993 | Nishimura et al. | 360/96.5 |
| 5,279,476 | 1/1994 | Fujii et al. | 360/132 |
| 5,325,243 | 6/1994 | Rath et al. | 369/77.2 |
| 5,452,271 | 9/1995 | Ohmori et al. | 369/13 |
| 5,530,691 | 6/1996 | Fujisawa | 369/291 |
| 5,548,460 | 8/1996 | Ohira et al. | 360/132 |
| 5,570,342 | 10/1996 | Kosaka | 369/291 |

*Primary Examiner*—Robert S. Tupper
*Assistant Examiner*—David L. Ometz
*Attorney, Agent, or Firm*—Limbach & Limbach L.L.P.

[57] ABSTRACT

When an MO disc cartridge 2 is inserted upside down, the leading end of a cartridge body 80 abuts against plate-like protuberances 100 provided on a tray 13 for preventing the erroneous insertion, and the cartridge body cannot be inserted further. Accordingly, erroneous insertion of the MO disc cartridge 2 can be reliably prevented. When the MO disc cartridge 2 is inserted with its upper and lower sides directed correctly, the protuberances 100 are received in respective erroneous insertion preventing grooves 86 formed in the upper surface of the cartridge body 80, thus permitting the MO disc cartridge 2 to be inserted up to the innermost position.

3 Claims, 20 Drawing Sheets

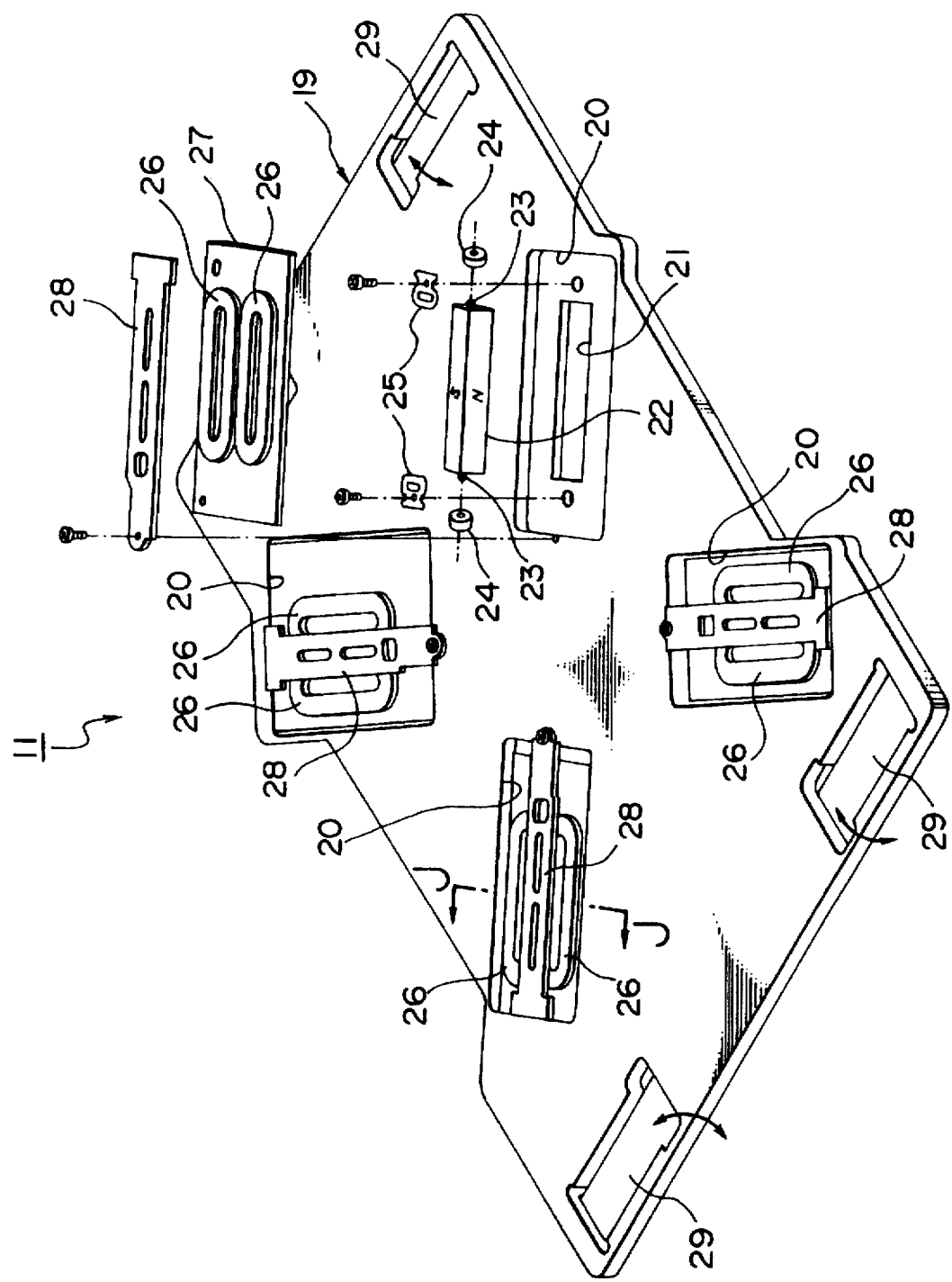

5,675,566

RECORDING AND/OR REPRODUCING APPARATUS AND A CARTRIDGE FOR A RECORDING MEDIUM

BACKGROUND OF THE INVENTION

1 Field of the Invention

The present invention relates to a recording and/or reproducing apparatus and a cartridge for a recording medium which are suited for use in an MO disc drive unit and an MO disc, respectively.

Description of the Prior Art

In many cases, an optical disc or MO (magneto-optic) disc, for example, which is removably set in a disc drive unit (recording and/or reproducing apparatus), is housed in a disc cartridge for use. Generally, the disc cartridge has an opening through which the recording surface of a disc is exposed while data is recorded or reproduced by means of an optical pickup, and a shutter for preventing extraneous matter from entering through the opening when the disc is not in use and also preventing other objects from accidentally contacting the recording surface. The shutter is normally closed, and when the disc cartridge is set in the disc drive unit, the shutter is opened by a shutter opening mechanism of the drive unit. Usually, the shutter opening mechanism opens the shutter by moving an engaging portion of the shutter provided on a side surface of the disc cartridge.

Meanwhile, there are discs called single-sided type, and if this type of disc is inserted upside down into the drive unit, a read section such as the optical pickup collides against a surface on which no shutter is provided, possibly causing damage to the pickup. To avoid the trouble, the disc cartridge and the drive unit are provided with an erroneous insertion preventing mechanism. Since the shutter opening mechanism occupies the side surface of the disc cartridge as mentioned above, the erroneous insertion preventing mechanism is generally provided at a front end portion of the disc cartridge, as described below.

FIGS. 24A and 24B illustrate an example of a conventional erroneous insertion preventing mechanism. This erroneous insertion preventing mechanism has a detection groove 121 and an inclined portion 122 formed at a front end portion of a disc cartridge 120 on opposite sides thereof, respectively, and a detection lever 123 is provided at the drive unit side. The detection groove 121 has an inclined outside surface 121A. The detection lever 123 is rotatably supported on a pivot 124, and has a roller 125 at a distal end thereof for contact with the inclined surface 121A of the detection groove 121 or with the inclined portion 122.

When the disc cartridge 120 is inserted into the drive unit with its upper and lower sides directed correctly, the roller 125 of the detection lever 123 moves along the inclined surface 121A of the detection groove 121, as shown in FIG. 24A, and thus the detection lever 123 rotates counterclockwise as viewed in the figure. Consequently, it is judged that the disc cartridge 120 has been inserted with the upper and lower sides thereof directed correctly.

On the other hand, if the disc cartridge 120 is inserted upside down into the drive unit, as shown in FIG. 24B, the roller 125 moves along the inclined portion 122, causing the detection lever 123 to rotate clockwise as viewed in the figure. Thus it is judged that the disc cartridge 120 has been inserted upside down.

The conventional erroneous insertion preventing mechanism requires the detection lever 123 and a mechanism utilizing outward or inward movement of the lever based on the rotating direction thereof, as described above, which leads to a complicated structure and increased cost. Some disc cartridges with no shutter have an erroneous insertion preventing mechanism provided on a side surface thereof, but since in this case the shutter opening mechanism cannot be provided, such arrangement is not applicable to disc cartridges with shutters.

OBJECT AND SUMMARY OF THE INVENTION

The present invention was created to solve the above problem, and an object thereof is to provide a recording and/or reproducing apparatus and a cartridge for a recording medium which are simple in structure, low in cost, and permit both a shutter opening mechanism and an erroneous insertion preventing mechanism to be provided.

To achieve the above object, the present invention provides a recording and/or reproducing apparatus which uses a recording medium housed in a cartridge, wherein a protuberance is provided so as to be inserted in an erroneous insertion preventing groove formed in an upper or lower surface of a cartridge body at a leading end thereof with respect to the inserting direction.

The present invention also provides a cartridge for accommodating a recording medium used in a recording and/or reproducing apparatus, wherein a groove is provided on an upper or lower surface of a cartridge body at a leading end thereof with respect to the inserting direction, for receiving an erroneous insertion preventing protuberance provided on the recording and/or reproducing apparatus.

When an MO disc cartridge 2 is inserted with its upper and lower sides directed correctly, as shown in FIGS. 18A and 18B, an erroneous insertion preventing groove 86 formed in the upper surface of a cartridge body 80 receives a protuberance 100 therein, thus permitting the MO disc cartridge 2 to be inserted up to the innermost position. By contrast, if the MO disc cartridge 2 is inserted upside down, as shown in FIGS. 19A and 19B, the leading end of the cartridge body 80 abuts against the plate-like erroneous insertion preventing protuberance 100 formed on a tray 13 and cannot be inserted further. It is, therefore, possible to prevent erroneous insertion of the MO disc cartridge 2 without fail.

BRIEF DESCRIPTION OF THE DRAWINGS

FIG. 3 is a view showing the structure of an MG chassis 11;

DETAILED DESCRIPTION OF THE PREFERRED EMBODIMENT

A recording and/or reproducing apparatus and a cartridge for a recording medium according to embodiments of the present invention will be now described in detail with reference to the drawings in which the apparatus and the cartridge are applied to an MO (magneto-optic) disc drive unit and an MO disc cartridge, respectively.

Figure 1:
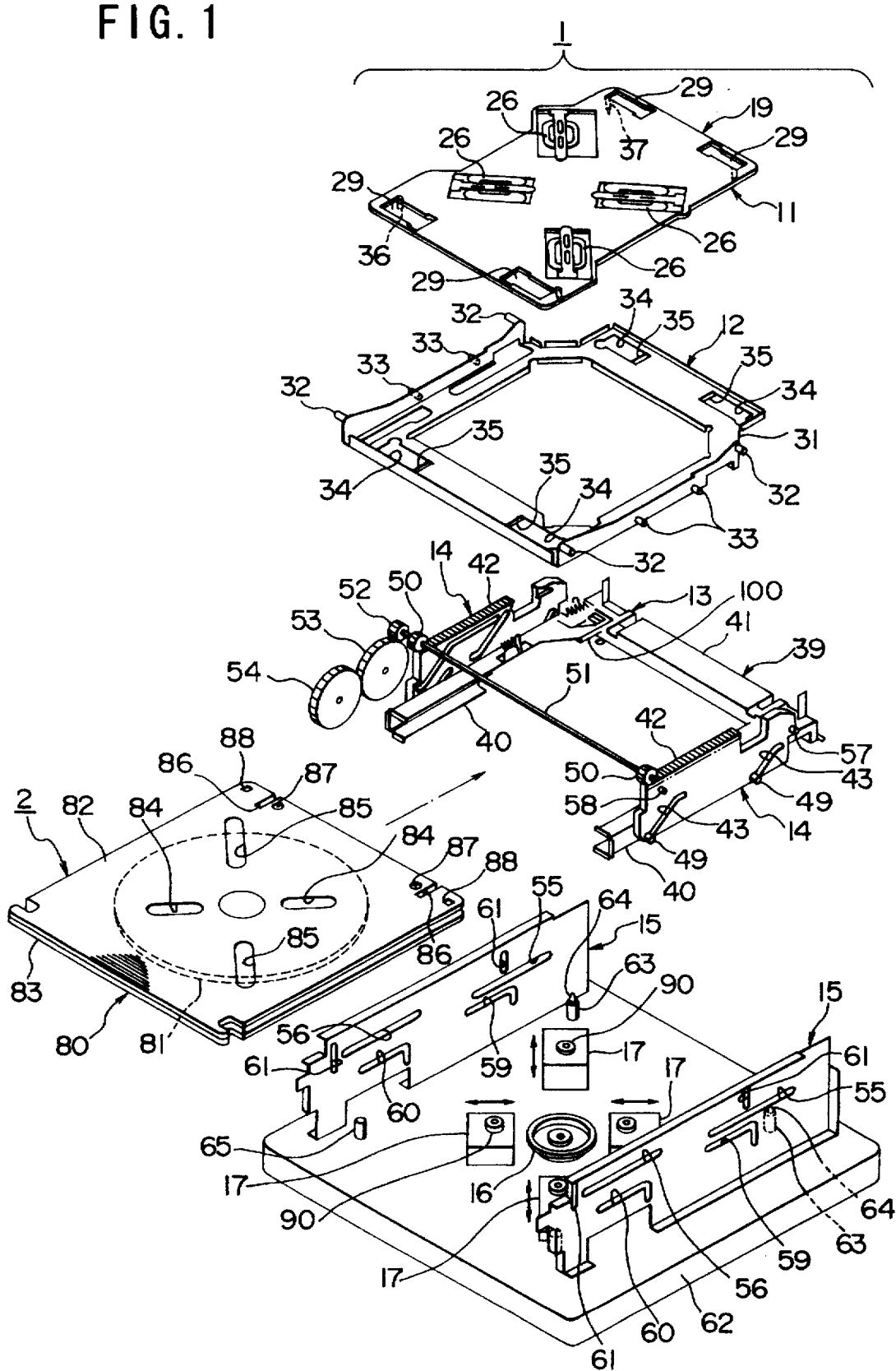
FIG. 1 is a perspective view showing various parts of an embodiment.
Figure 2:
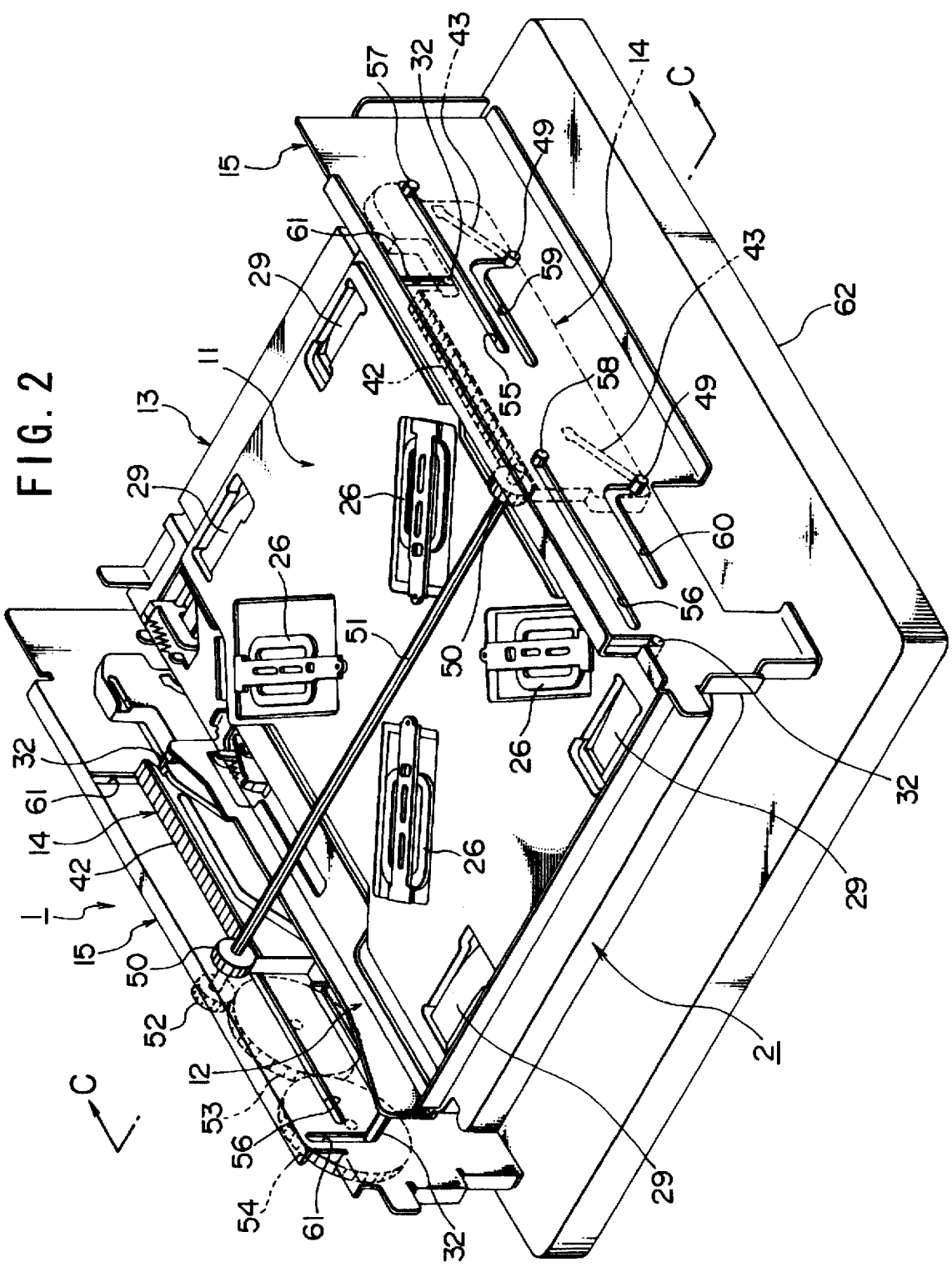
FIG. 2 is a view showing an assembly of the embodiment.

FIG. 1 is a perspective view showing various parts of an MO disc drive unit 1 and an MO disc cartridge 2 to which are respectively applied the recording and/or reproducing apparatus and the cartridge for a recording medium according to the present invention. FIG. 2 shows a state in which the various parts of the MO drive unit 1 are assembled. The MO drive unit 1 comprises a vertically movable MG (magnet) drive plate 12 for vertically moving an MG chassis 11 to which auxiliary magnetic field generating means is mounted, a tray 13 horizontally and vertically movable between an insertion position and a loading position to permit the insertion and ejection of the MO disc cartridge 2, horizontally movable cam plates 14 for vertically moving the MG drive plate 12 and horizontally and vertically moving the tray 13, and a base 62 on which are arranged side plates 15, 15 for regulating the moving directions of the MG drive plate 12, tray 13 and cam plates 14, a turntable 16, optical pickups 17, a control section, a spindle motor, etc.

The MG chassis 11 includes a generally rectangular mounting board 19 made of an elastic resin, for example, rectangular recesses 20 formed in the board 19 at angular intervals of about 90 degrees, and through holes 21 formed in the bottom surfaces of the respective recesses 20, as clearly shown in FIG. 3. A permanent magnet 22 as the auxiliary magnetic field generating means is arranged in each through hole 21, bearings 24 are fitted on opposite center shafts 23 of the magnet 22, respectively, and the magnet 22 is fixed in the corresponding recess 20 by presser plates 25. A substrate 27 with a pair of coils 26 is arranged above each permanent magnet 22, and a supporting plate 28 as a back yoke is placed on the substrate 27. By changing the direction of electric current flowing through the coils 26, the direction of the magnetic field generated in this area changes; accordingly, the permanent magnet 22 rotates because a magnetic pole thereof repels the magnetic field, thereby changing the direction of the auxiliary magnetic field. This permits data to be recorded on a disc within the disc cartridge 2 loaded into the drive unit.

Figure 4A:
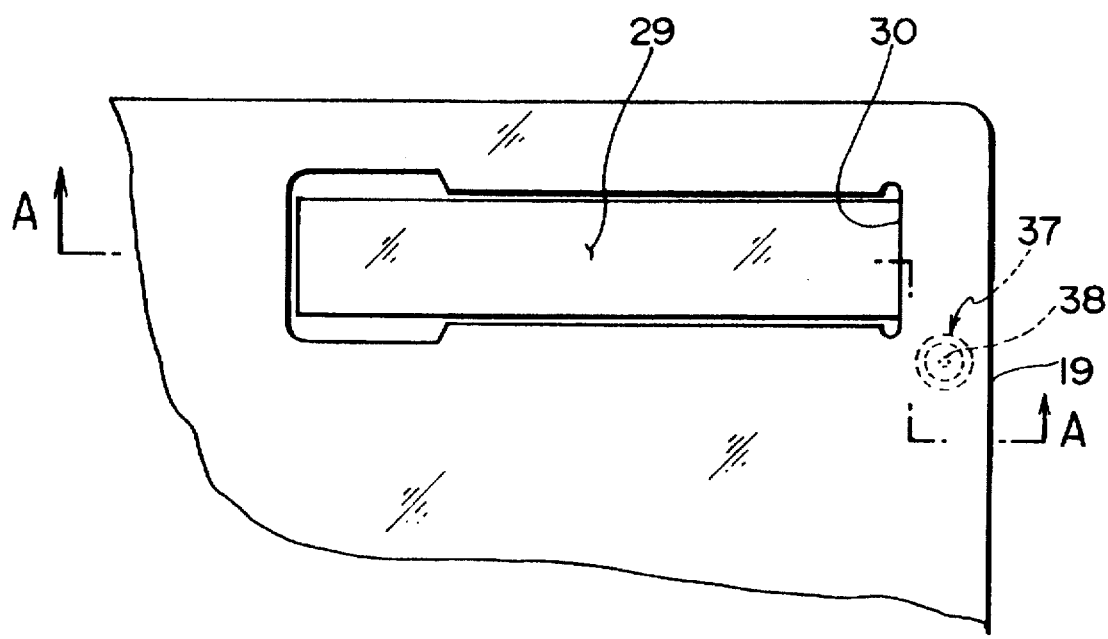
FIG. 4A and 4B are views showing the shape of a clamp member 29.
Figure 4B:
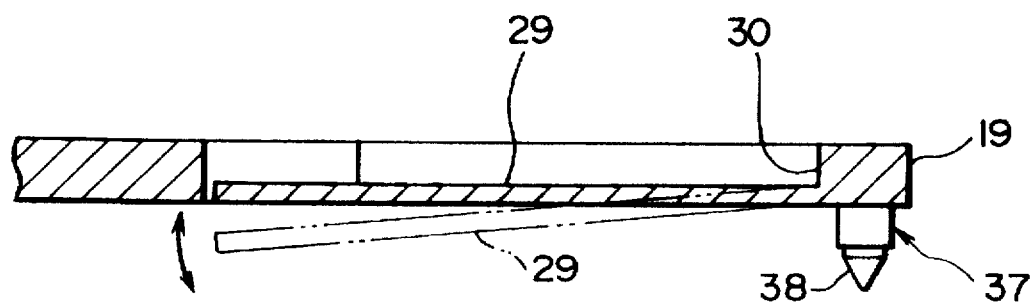

A clamp member 29 is provided at each of the four corners of the mounting board 19, as clearly shown in FIGS. 4A and 4B. As shown in FIG. 4A, each clamp member 29 is in the form of a rectangle whose sides are parallel to respective edges of the mounting board 19. Among these four sides, the outside one of the longitudinally opposite sides remains connected to the board 19 and serves as a fixing portion 30, while the other three sides are cut off. Also, as shown in FIG. 4B, an upper portion of each clamp member 29 is cut off and thus reduced in thickness so that the clamp member 29 may function as a leaf spring capable of being elastically deformed in a vertical direction about the fixing portion 30.

Referring again to FIG. 1, the MG drive plate 12 includes a thin rectangular frame 31, and two guide pins 32 protrude from opposite ends, respectively, of each of two side surfaces of the frame 31. Further, on each side surface of the frame 31 at a location between the two guide pins 32, two slide pins 33 protrude at a suitable interval therebetween. An engaging hole 34, which is generally rectangular and has a circular corner, is formed in each of the four corners of the frame 31. The engaging holes 34 engage with the respective clamp members 29 of the MG chassis 11 and limit horizontal displacement of the MG chassis 11 relative to the MG drive plate 12.

Figure 5A:
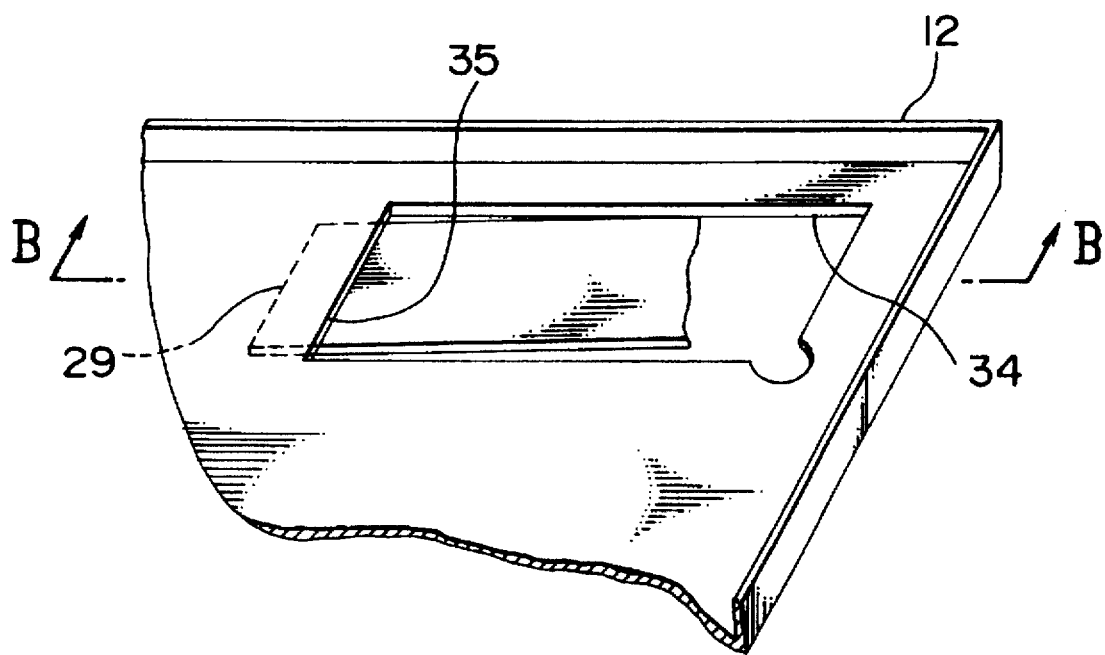
FIG. 5A and 5B are views showing the shape of an engaging hole 34 of an MG drive plate 12.
Figure 5B:
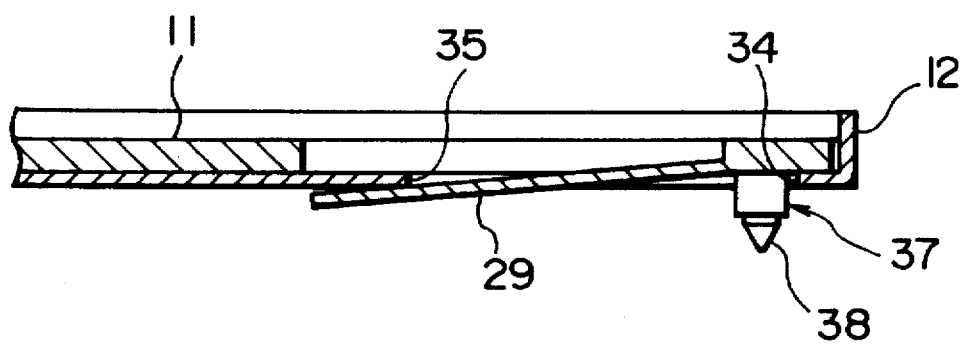

As shown in FIG. 5A, each engaging hole 34 is formed so that the inside one 35 of longitudinally opposite edges thereof can engage with the distal end of the corresponding clamp member 29 of the MG chassis 11. Specifically, the MG chassis 11 is placed on the MG drive plate 12, then the distal ends of the clamp members 29 are pushed down and inserted into the respective engaging holes 34, as shown in FIG. 5B, whereby the clamp members 29 at the four corners are engaged with the respective engaging holes 34 and the MG chassis 11 is mounted to the MG drive plate 12 in such a manner that the former cannot accidentally disengage from the latter (while permitting the MG chassis 11 to horizontally move to a certain extent so that the chassis 11 can be positioned on the cartridge 2).

Figure 6:
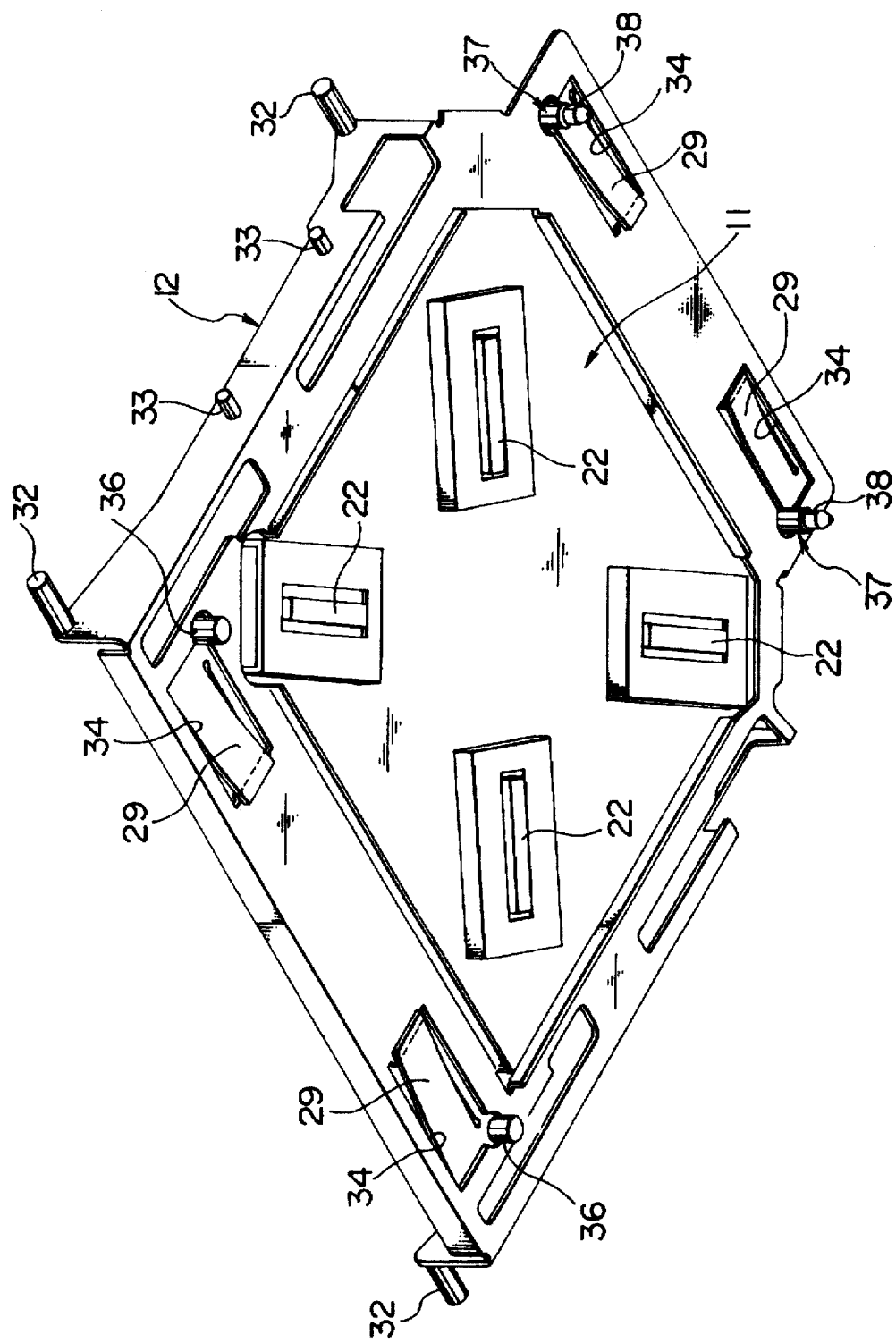
FIG. 6 is a perspective view of the MG chassis 11 and the MG drive plate 12 as viewed from below.

As shown in FIG. 6, on the lower surface of the MG chassis 11 are provided two vertical positioning pins 36 and two horizontal positioning pins 37 which are located at the four corners, respectively, or more specifically, in the illustrated example, at locations close to the proximal ends of the respective clamp members 29. Each vertical positioning pin 36 is cylindrical in shape and has a level lower end face. Each horizontal positioning pin 37 is similar in shape to the vertical positioning pin 36 but has a conical protuberance 38 at a distal end thereof. The horizontal positioning pins 37 serve to horizontally position the permanent magnets 22 received in the respective through holes of the MG chassis 11, and are located such that their positions relative to the permanent magnets 22 fall within a predetermined dimensional tolerance.

Referring again to FIG. 1, the tray 13 serves to load and eject the MO disc cartridge 2, and has a U-shaped frame member 39 which is open at one side thereof. A holding member 40 having a U-shaped cross-sectional form is provided on each of opposite sides of the frame member 39. When the body 80 of the MO disc cartridge 2 is inserted with their side edges received in the respective holding members 40, the holding members 40 stably hold the MO disc cartridge 2 and also permit an MO disc 81 within the cartridge 2 to be placed on the turntable 16 of the base 62. The holding members 40 have respective rear ends connected to each other by a connecting member 41. The tray 13 is further provided with catching rollers (not shown) which are inserted by a spring force into respective insertion holes 88 formed in the body 80 of the MO disc cartridge 2.

Figure 7:
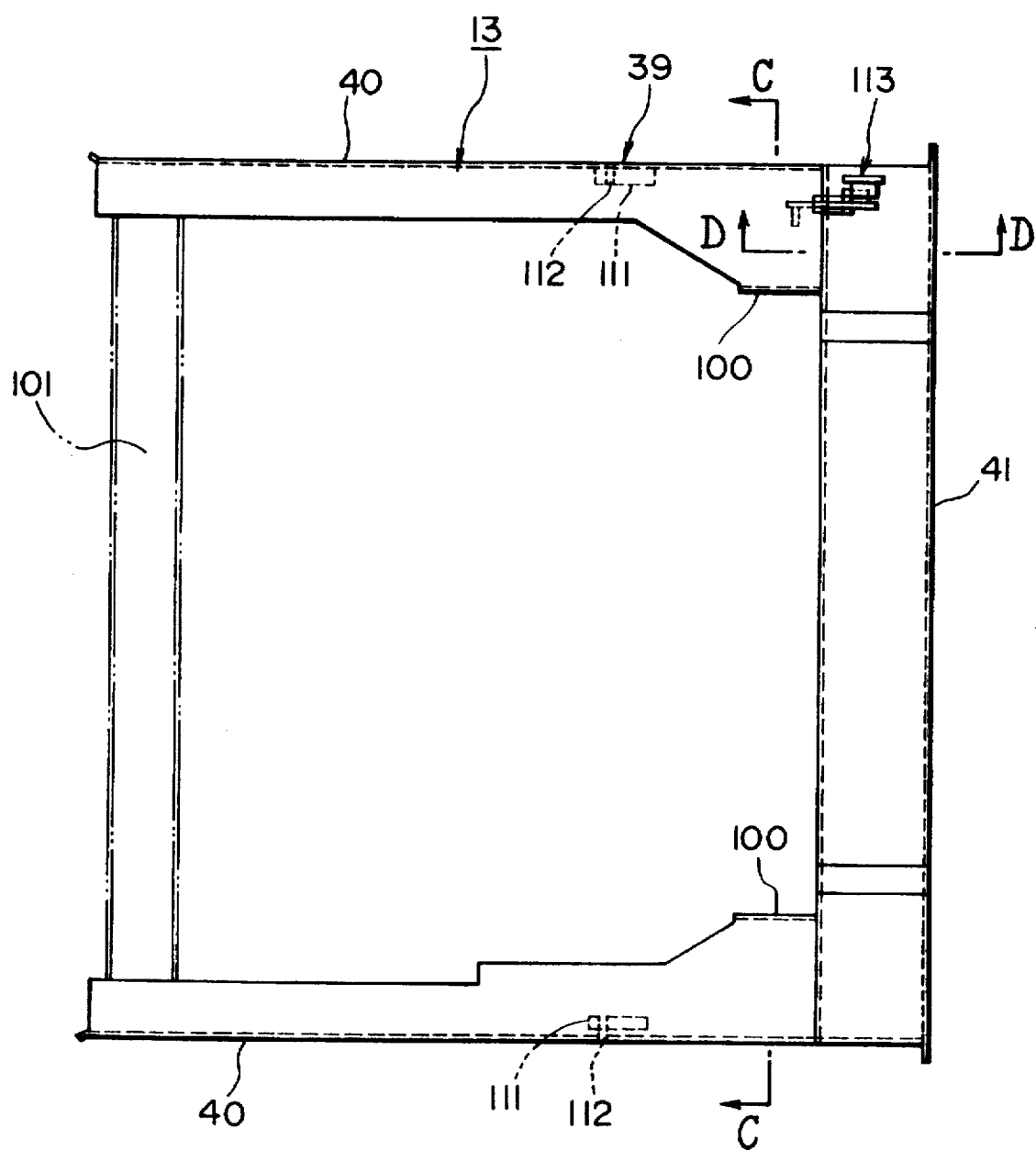
FIG. 7 is an upper side view of a tray 13.
Figure 8:
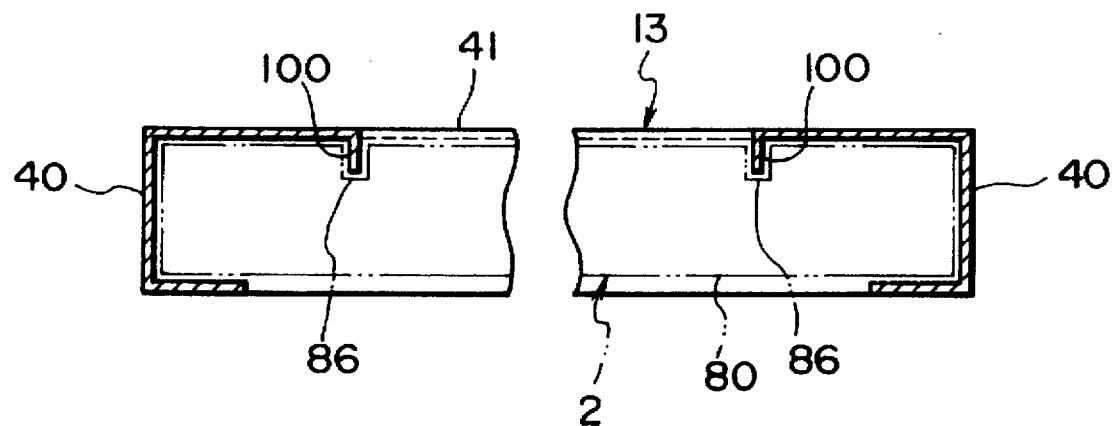
FIG. 8 is a sectional view taken along line C—C in FIG. 7.

To prevent the MO disc cartridge 2 from being inserted upside down, the tray 13 is provided with elongate plate-like protuberances 100 for preventing erroneous insertion, as clearly shown in FIG. 7. The protuberances 100 are formed by bending downward the inner edges of rear end portions of the respective holding members 40, as shown in FIG. 8, and are in contact with the connecting member Each protuberance 100 has a shape such that it can be inserted into a corresponding one of erroneous insertion preventing grooves 86 formed in the upper surface of the body 80 of the MO disc cartridge 2. The holding members 40 are open at their front end so as to permit the insertion of the disc cartridge 2; therefore, to prevent the front ends from being easily deformed, a reinforcing member 101 may be provided to connect those front end portions of the holding members 40 which do not obstruct the insertion of the cartridge, as indicated by the two-dot-chain lines in FIG. 7. Further, levers 111 for opening shutters 92 (FIG. 15) of MO disc cartridge 2 are pivotally mounted via pivots 112 on the opposite inner surfaces of the holding members 40 of the tray 13, respectively, as shown in FIG. 7. The shutter opening levers 111 are arranged on both sides of the tray.

Figure 9:
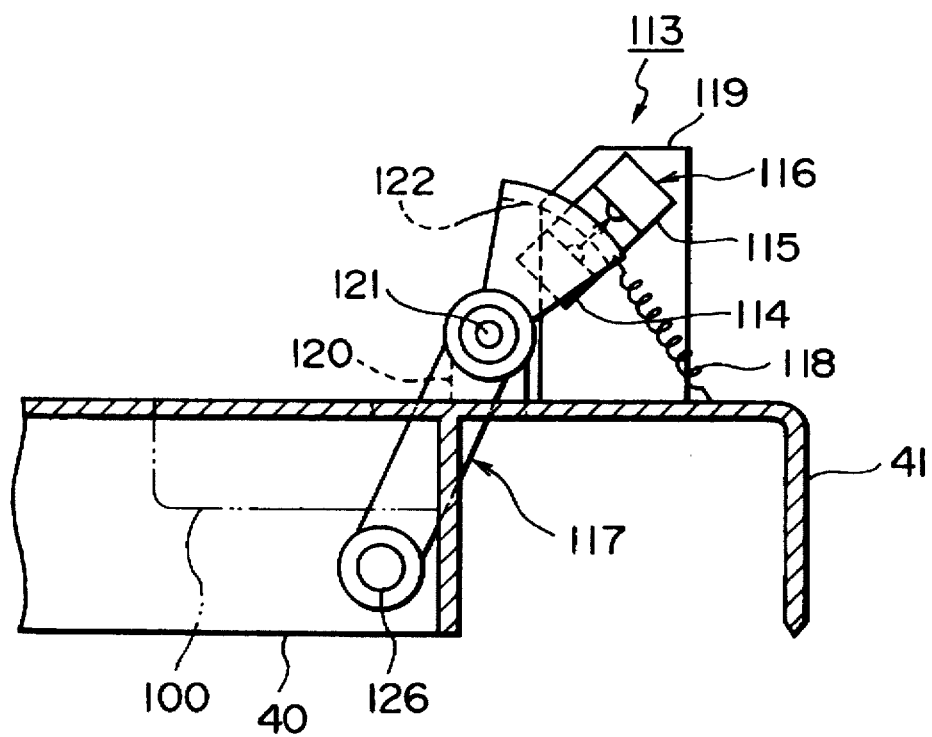
FIG. 9 is a sectional view taken along line D—D in FIG. 7.

As shown in FIG. 9, a detecting mechanism 113 for detecting the MO disc cartridge 2 is arranged at the rear side of the tray 13. The detecting mechanism 113 includes a sensor 116 having a light-emitting section 114 and a light-receiving section 115, a pusher lever 117, and a tension spring 118 pulling the pusher lever 117 clockwise as viewed in the figure. The sensor 116 is fixed to a mounting plate 119 of the tray 13, and the pusher lever 117 is rotatably mounted via a pivot 121 on a supporting plate 120 of the tray 13. The pusher lever 117 has a shielding member 122 at an upper end thereof, and this shielding member 122 is located between the light-emitting section 114 and the light-receiving section 115 of the sensor 116. A pin 126 protrudes from a lower end portion of the pusher lever 117. The operation of the detecting mechanism 113 will be described later.

Figure 10:
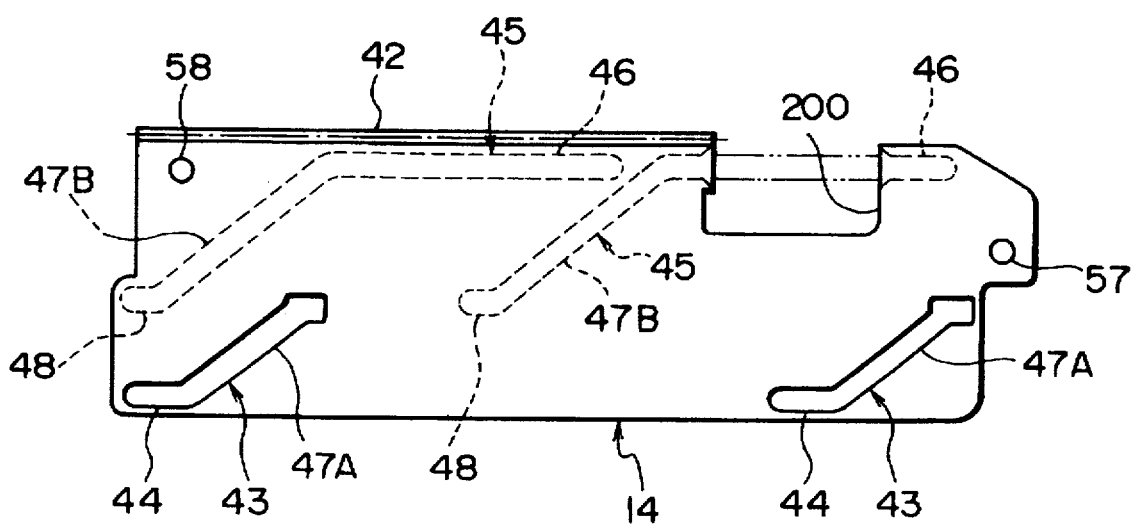
FIG. 10 is a side view showing the shape of a cam plate 14.

As shown in FIG. 1, the cam plates 14 are arranged on opposite sides of the tray 13, respectively. Each cam plate 14 is horizontally movably arranged inside the corresponding side plate 15, as shown in FIG. 2. As clearly shown in FIG. 10, each cam plate 14 is generally rectangular in shape and has a rack 42 formed at an upper surface thereof. At a lower portion of the cam plate 14 are formed two guide holes 43 for controlling the timing of horizontal and vertical movement of the tray 13. Each guide hole 43 has an inclined portion 47A inclined at a suitable angle and a horizontal portion 44. Also, two guide grooves 45 are formed in an upper portion of each cam plate 14 for controlling the timing of vertical movement of the MG drive plate 12. Specifically, each guide groove 45 is formed in the inner surface of the corresponding cam plate 14, and has an upper horizontal portion 46, an inclined portion 47B and a lower horizontal portion 48. A rectangular cut 200 is formed at an end portion of the upper part of each cam plate 14 so as not to interfere with the guide pins 32 when the MG drive plate 12 moves up or down. The inclined portion 47B of the guide groove 45 for controlling the vertical movement of the MG drive plate 12 has a vertical length greater than that of the inclined portion 47A of the guide hole 43 for controlling the vertical movement of the tray 13, whereby after the tray 13 is stopped at its lower limit position, the MG drive plate 12 can be further lowered, as described later. Further, the tray 13 and the MG drive plate 12 are constructed such that they are lowered simultaneously. Pins 57 and 58 protrude from the outer surface of each cam plate 14 at rear and front end portions thereof, respectively.

As shown in FIG. 1, pins 49 protruding from the tray 13 are movably fitted in the respective guide holes 43 of the cam plates 14, and thus the tray 13 is held in a horizontal position. Also, the slide pins 33 of the MG drive plate 12 are received in the respective guide grooves 45, whereby the MG drive plate 12 is held in a horizontal position. The racks 42 of the cam plates 14 are in mesh with respective gears 50. The gears 50 are securely connected to each other by a shaft 51. A pinion 52 is securely fitted on one end of the shaft 51 and is meshed with an intermediate gear 53, which in turn is engaged with a driving gear 54. As the driving gear 54 is rotated by a motor or the like, the gears 50 are rotated via the intermediate gear 53 and the pinion 52, and thus the cam plates 14 move horizontally.

The side plates 15 are set upright on opposite sides of the base 62, respectively, as shown in FIG. 2. To limit the movement of the cam plates 14, two horizontally elongate holes 55 and 56 are formed in each side plate 15. The pins 57 and 58 of the cam plates 14 are inserted in the respective elongate holes 55 and 56, whereby the cam plates 14 are allowed to move only in the horizontal direction. Further, to regulate the moving direction of the tray 13, two L-shaped holes 59 and 60 are formed in each side plate 15. In these L-shaped holes 59 and 60 are inserted the pins 49 of the tray 13 projecting to the outside beyond the respective cam plates 14.

Further, two vertically elongate holes 61 are formed in the upper portion of each side plate 15, and the guide pins 32 of the MG drive plate 12 are inserted into the respective holes 61. Accordingly, the MG drive plate 12 and the MG chassis 11 carrying the permanent magnets 22 are allowed to move only in the vertical direction.

As shown in FIG. 1, the base 62 is provided with, in addition to the side plates 15, the turntable 16 located in the center thereof, the optical pickups 17 arranged corresponding in position to the respective permanent magnets 22 (FIG. 3) of the MG chassis 11 and movable in the radial direction of the MO disc 81 within the MO disc cartridge 2 for reading a signal recorded on the MO disc 81, and pins 63 and 65 for positioning the MO disc cartridge 2. Among the pins 63 and 65, the pins 63 each have a conical protuberance 64 at a distal end thereof. The aforementioned shaft 51, intermediate gear 53 and driving gear 54 are rotatably mounted on the side plates 15. The base 62 is further provided with a spindle motor 66 (FIG. 20) for driving the turntable 16, an electric circuit for controlling various sections, etc.

The MO disc cartridge 2 will be now explained. As shown in FIG. 1, the MO disc cartridge 2 comprises a hollow rectangular cartridge body 80 and an MO disc 81 rotatably housed in the body 80. The cartridge body 80 is made up of upper and lower cases 82 and 83 combined together, and each case is preferably made of resin.

Figure 13:
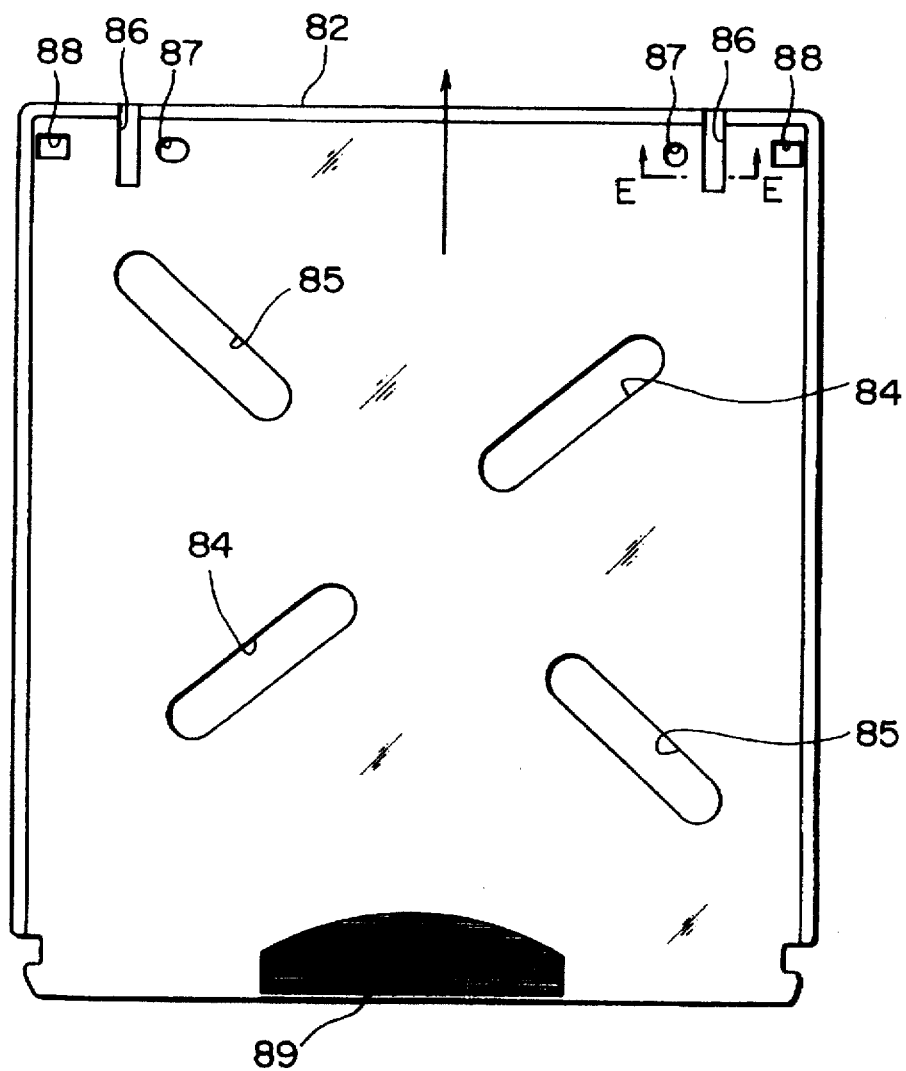
FIG. 13 is an upper side view of an MO disc cartridge 2.

Four radial grooves 84 and 85 are formed in the surface of the upper case 82 at substantially equal angular intervals, to permit the auxiliary magnetic field generating means, or more specifically, in this embodiment, the lower portions of the respective permanent magnets 22 (FIG. 3), to be received therein, as clearly shown in FIG. 13. Diametrically opposite pairs of the grooves, that is, the pair 84, 84 and the pair 85, 85, are located at the same distance from the center, but adjacent grooves 84 and 85 are located at different distances from the center. This is because, among the four optical pickups 17 (FIG. 1), two opposite pickups are designed to reproduce the inner recording area and outer recording area, respectively of the MO disc 81, and thus the permanent magnets 22 are so arranged as to cover the moving ranges of the corresponding optical pickups 17. The bottom walls of the grooves 84 and 85 each have a thickness large enough to ensure sufficient strength.

Figure 14:
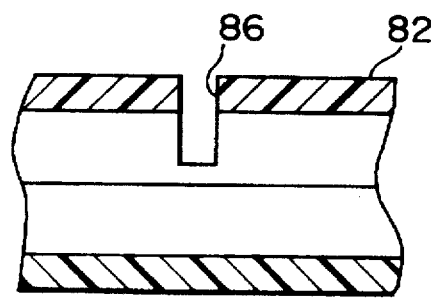
FIG. 14 is a sectional view taken along line E—E in FIG. 13.

The aforementioned erroneous insertion preventing grooves 86 are cut in the front end of the upper case 82 on opposite sides thereof, respectively. As shown in FIG. 14, the erroneous insertion preventing grooves 86 are formed only in the upper case 82 and have a shape such that they can receive the respective slender plate-like protuberances 100 formed on the tray 13 for preventing the erroneous insertion. It is, therefore, possible to prevent the MO disc cartridge 2 from being inserted upside down into the tray 13, as described later.

The upper case 82 is further provided with two auxiliary magnetic field positioning holes 87 and two catching roller insertion holes 88. The auxiliary magnetic field positioning holes 87 serve to accurately position the MG chassis 11 at the time of loading, and receive the respective protuberances 38 of the horizontal positioning pins 37 of the MG chassis 11, shown in FIG. 6, while leaving almost no gap therebetween. Thus, the distance between the auxiliary magnetic field positioning holes 87 is equal to that between the horizontal positioning pins 37. At the rear end portion of the upper case 82 is provided a knurled portion 89 for preventing slipping when the cartridge is handled.

Figure 15:
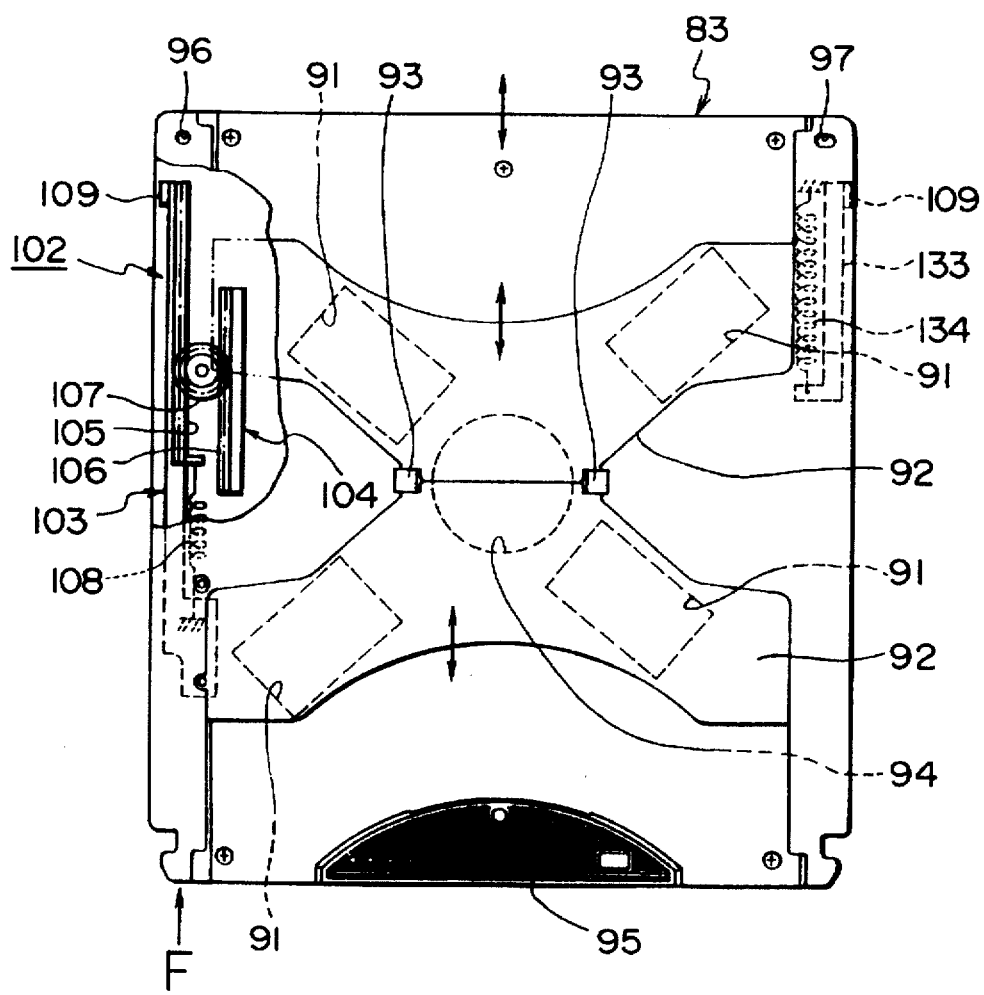
FIG. 15 is a lower side view showing a state in which shutters 92 of the MO disc cartridge 2 are closed.

As shown in FIG. 15, four rectangular openings 91 are formed in the lower case 83 of the MO disc cartridge 2 at angular intervals of about 90 degrees to permit object lenses 90 of the respective optical pickups 17 to be inserted therethrough, and two shutters 92, each movable back and forth to make an aperture therebetween, are arranged over the openings 91. The shutters 92 are positioned in their closed position by stoppers 93 provided in the central portion of the lower case. A mechanism 102 for opening the shutters 92 is arranged within the cartridge body 80.

Figure 16:
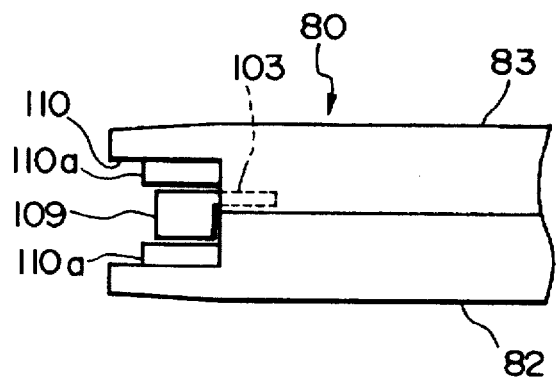
FIG. 16 is a view of the cartridge as viewed in the direction of arrow F in FIG. 15.

The shutter opening mechanism 102 comprises a first slide lever 103 for opening the rear-side shutter 92, a second slide lever 104 for opening the front-side shutter 92, a pinion 107 meshed with opposing racks 105 and 106 arranged on the levers 103 and 104, respectively, and a spring 108 pulling the slide lever 103 rearward. An engaging portion 109 protrudes from the front end of the first slide lever 103. As shown in FIG. 16, the engaging portion 109 projects into a U-shaped groove 110 formed in a side surface of the cartridge body 80. Steps 110a for guiding the shutter opening lever 111 as described below are formed inside the U-shaped groove 110. Each of the slide levers 103 and 104 is allowed to slide back and forth only. A dummy slider 133, which also is slidable back and forth, is arranged on the side of the lower case opposite to the shutter opening mechanism 102. The dummy slider 133 is pulled frontward by a spring 134 and has an engaging portion 109 at a front end thereof.

A circular hole 94 is formed in the center of the lower case 83 to permit the insertion of the turntable 16 (FIG. 1), and when the shutters 92 are open, the circular hole 94 and the openings 91 are exposed. The object lenses 90 of the optical pickups 17 are inserted into the respective openings 91, and the turntable 16 is inserted into the circular hole 94, whereupon the MO disc 81 is clamped. The lower case 83 also has a knurled portion 95 formed at the rear end portion thereof, and has a positioning hole 96 and a positioning elongate hole 97 formed in the front end portion thereof to permit the positioning pins 63, 63 of the base 62 to be inserted therethrough, respectively. The shutter opening lever 111 is attached to the side of the tray 13 as shown in FIG. 18. An engaging piece 111A protrudes from the middle of the surface side of the shutter opening lever 111, which surface side faces to the cartridge body 80. When the cartridge body 80 moves, the engaging piece 111A comes in contact with the engaging portion 109 described above. The engaging piece 111A is slightly narrower than the width of the U-shaped groove 110.

Figure 17:
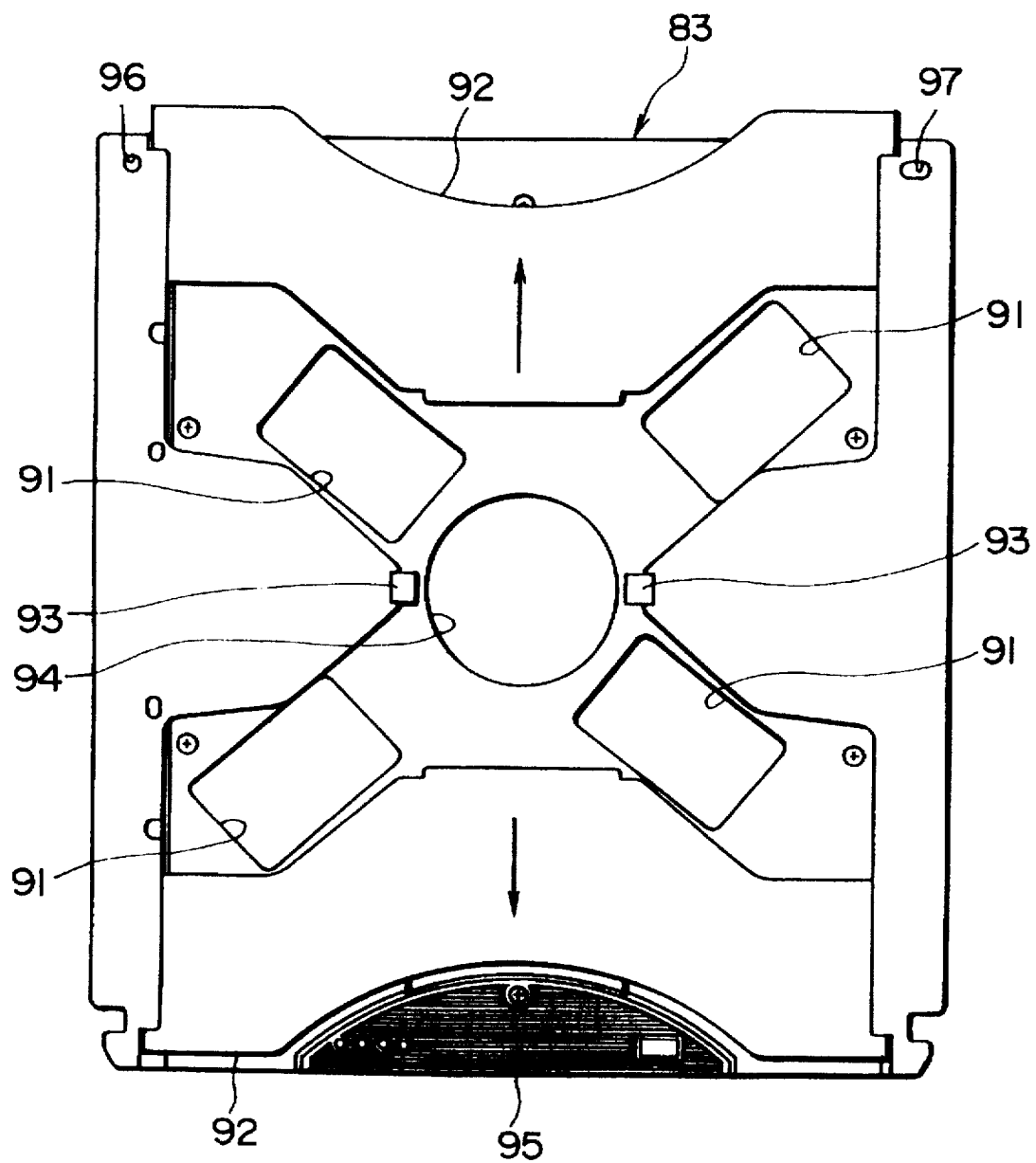
FIG. 17 is a lower side view showing a state in which the shutters 92 of the MO disc cartridge 2 are opened.
Figure 18A:
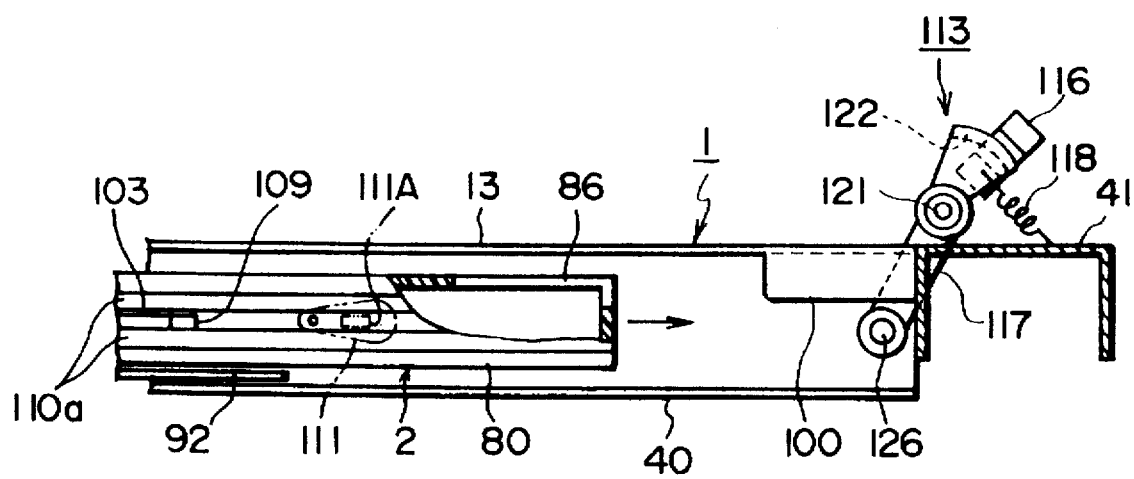
FIG. 18A and 18B are views illustrating an operation when the MO disc cartridge 2 is inserted with the upper and lower sides thereof directed correctly.
Figure 18B:
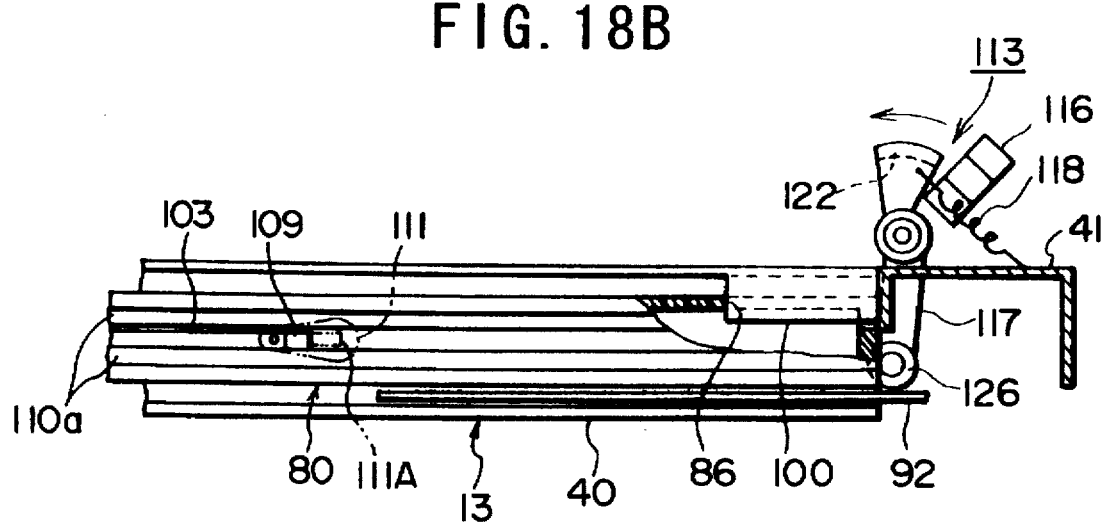

In the MO drive unit 1 and the MO disc cartridge 2 described above, as the MO disc cartridge 2 is inserted into the tray 13 for reproduction, with the upper and lower sides thereof directed correctly as shown in FIG. 18A, the engaging pieces 111A are inserted into the U-shaped grooves 110 formed in the both side surfaces of the cartridge body 80, and the cartridge body 80 in such situation moves frontward. The cartridge body 80 moves frontward, guided by the engaging pieces 111A which are formed on the inside surface of the shutter opening levers 111. When the engaging pieces 111A come in contact with the engaging portions 109 and the cartridge body 80 further moves frontward, since the engaging portions 109 move rearward relative to the cartridge body 80, the first slide lever 103 also moves rearward, whereby the rear-side shutter 92 opens as shown in FIG. 17. At this time, the second slide lever 104 is moved relatively frontward via the pinion 107, and accordingly, the front-side shutter 92 also opens. Then, while the shutters 92 are opening, the erroneous insertion preventing grooves 86 of the cartridge body 80 gradually receive the respective protuberances 100 of the tray 13, and the cartridge body 80 stops upon abutting against the connecting member 41 of the tray 13. At this time, the MO disc cartridge 2 is urged in its insertion position by the catching rollers, and also the tension spring 108 exerts a force to push out the cartridge body 80. Further, since the engaging portion 109 of the dummy slider 133 also is engaged with the corresponding shutter opening lever 111, the spring 134 exerts a force to push out the cartridge body 80 while the body 80 is in a completely inserted state.

As the MO disc cartridge 2 is inserted up to the innermost position in the tray 13 in this manner, the pin 126 at the lower end of the pusher lever 117 of the detecting mechanism 113 is pushed by the cartridge body 80 and thus the pusher lever 117 is rotated counterclockwise in the figure by a predetermined angle. As a result, the shielding member 122 of the pusher lever 117 comes out from between the light-emitting section 114 and the light-receiving section 115 of the sensor 116, and light emitted from the light-emitting section 114 is received by the light-receiving section 115. Thus, it is judged that the MO disc cartridge 2 has been inserted correctly, whereupon the drive unit 1 starts loading operation.

Figure 19A:
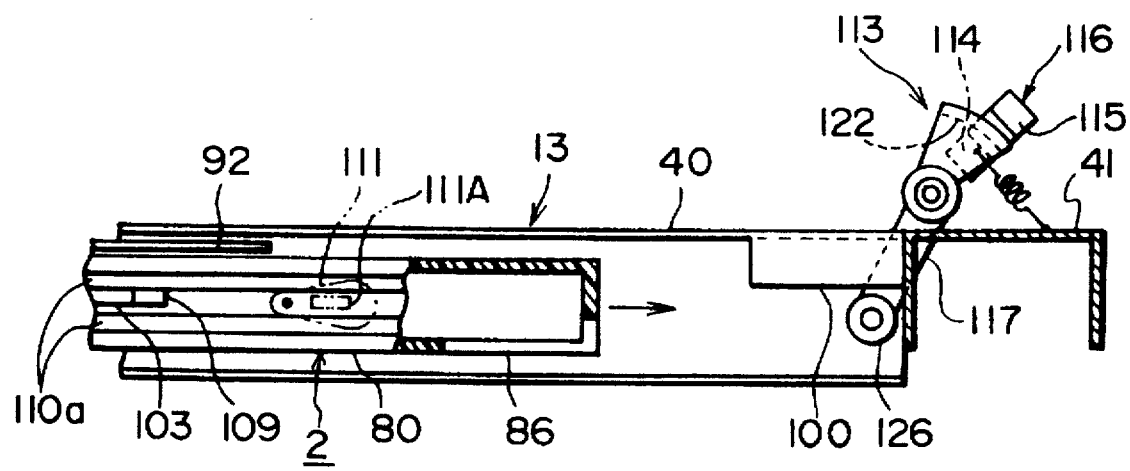
FIG. 19A and 19B are views illustrating an operation when the MO disc cartridge 2 is inserted upside down.
Figure 19B:
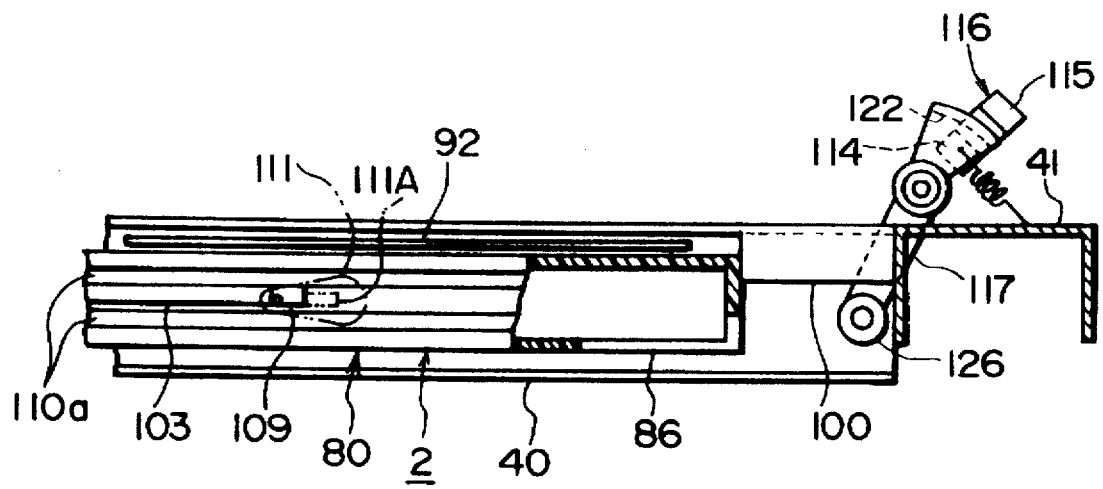

On the other hand, when the MO disc cartridge 2 is inserted upside down into the tray 13, as shown in FIG. 19A, the erroneous insertion preventing grooves 86 face downward. Accordingly, the front end of the cartridge body 80 abuts against the distal ends of the protuberances 100, as shown in FIG. 19B, and thus the MO disc cartridge 2 cannot be inserted further. At this time, since the front end of the cartridge body 80 is located at a distance from the pin 126 of the pusher lever 117 of the detecting mechanism 113, the detecting mechanism 113 is not actuated. Consequently, the optical pickups 17 and various motors are not operated while the cartridge is in this state, and it is possible to prevent the collision between, and thus damage to, the optical pickups 17 and the MO disc cartridge 2. In this case, the shutters 92 of the MO disc cartridge 2 are partly opened. By suitably setting the positions of the distal ends of the protuberances 100, however, it is possible to permit the shutters 92 to open only to such an extent that the shutters 92 never collide with the protuberances 100. That is, the positions of the distal ends of the protuberances 100 are suitably set so that the shutters 92 may not project from the front end of the disc cartridge body 80.

Figure 11A:
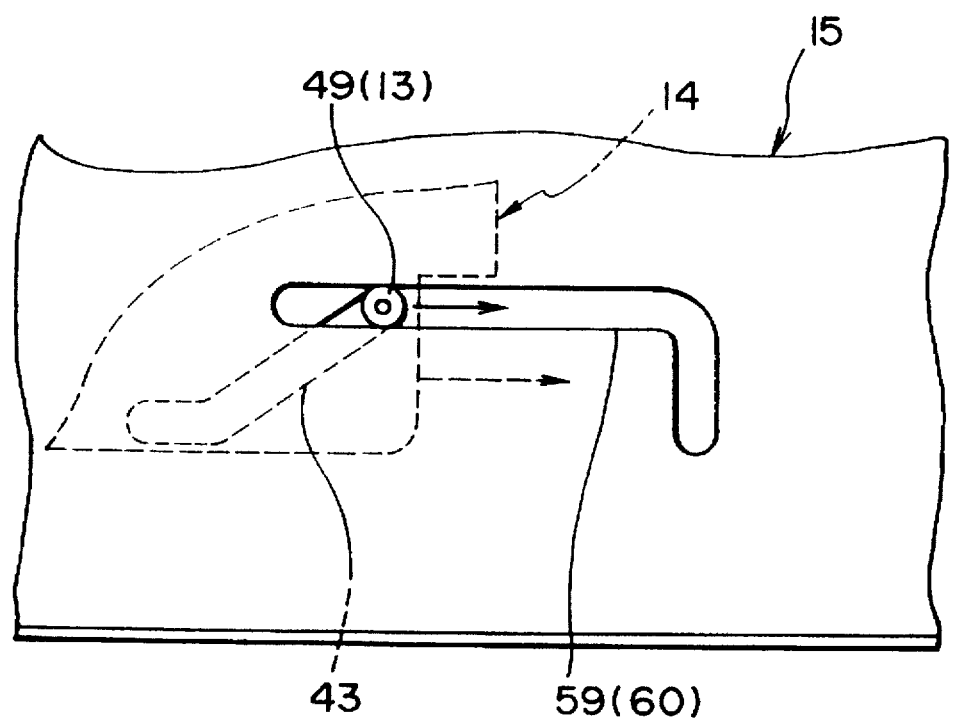
FIG. 11A and 11B are views showing the moving direction of a pin 49 of the tray 13.
Figure 11B:
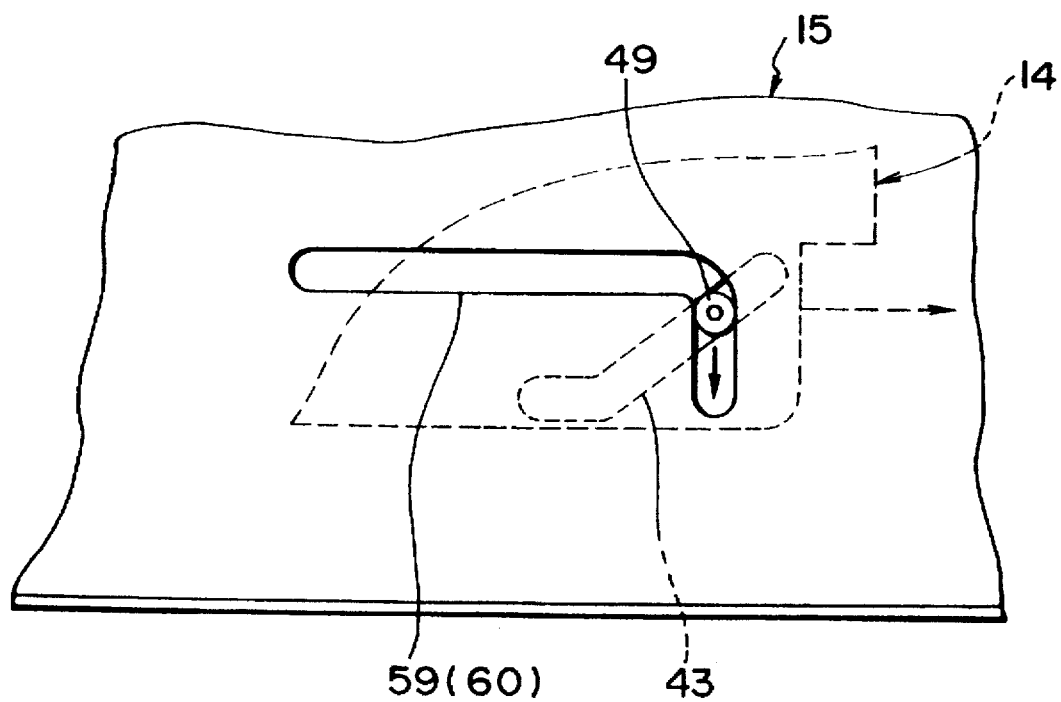
Figure 20:
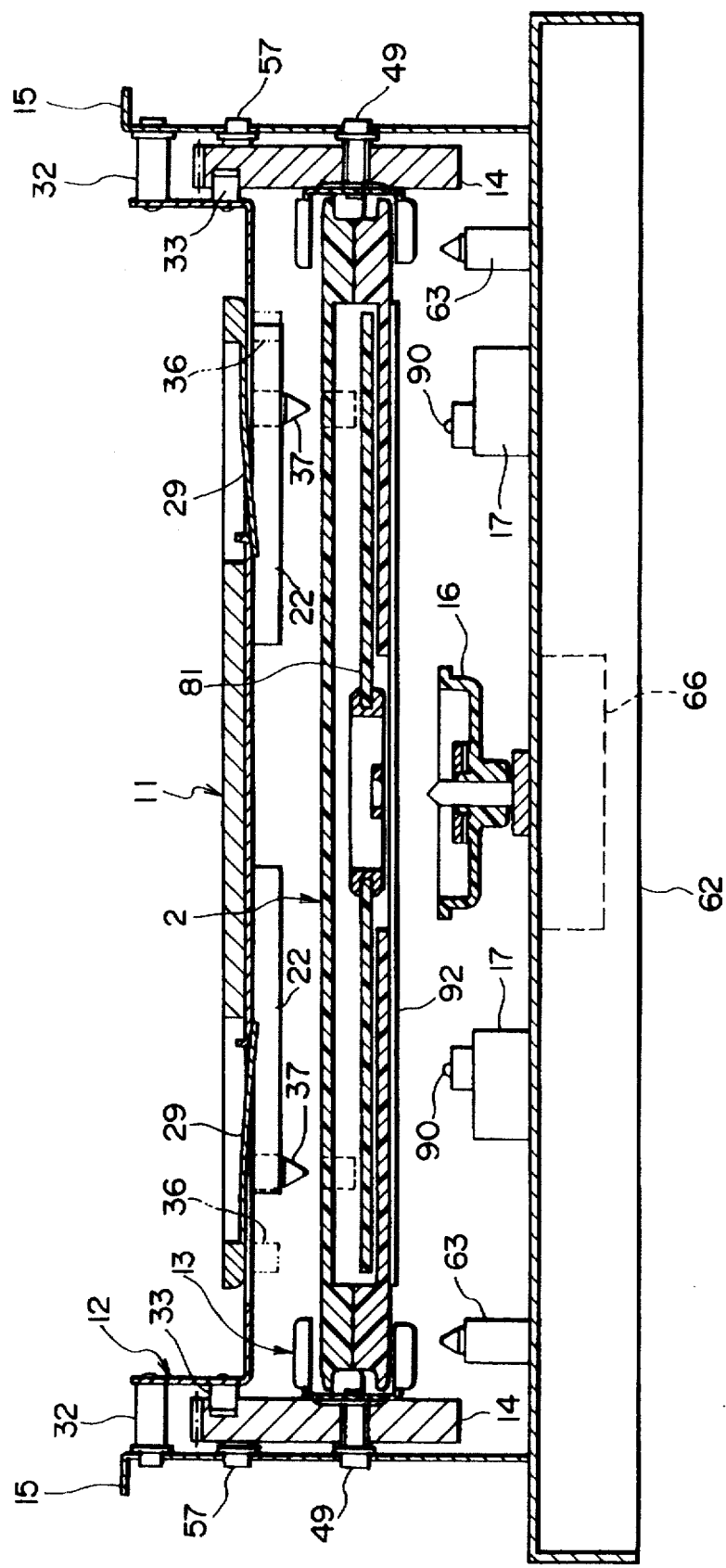
FIG. 20 is a sectional view taken along line G—G in FIG. 2.

When the MO disc cartridge 2 is inserted correctly as shown in FIG. 20, the detecting mechanism 113 operates in the above-described manner and a drive motor rotates to horizontally move the cam plates 14, whereby the tray 13 is horizontally withdrawn to the inside. As the cam plates 14 move horizontally, the pins 49 of the tray 13 are pushed in the moving direction of the cam plates 14 by the ends of the respective guide holes 43 of the cam plates 14, as shown in FIG. 11A. If, at this time, the pins 49 of the tray 13 are situated in the horizontal portions of the L-shaped holes 59 and 69 of the side plates 15, the tray 13 moves horizontally. After the pins 49 reach the vertical portions of the respective L-shaped holes 59 and 60, as shown in FIG. 11B, the pins 49 are then pushed downward by the guide holes 43 and thus the tray 13 lowers along the vertical portions of the holes 59 and 60. Consequently, the MO disc cartridge 2 within the tray 13 can be loaded into a predetermined position of the base 62 for rotation.

Figure 12A:
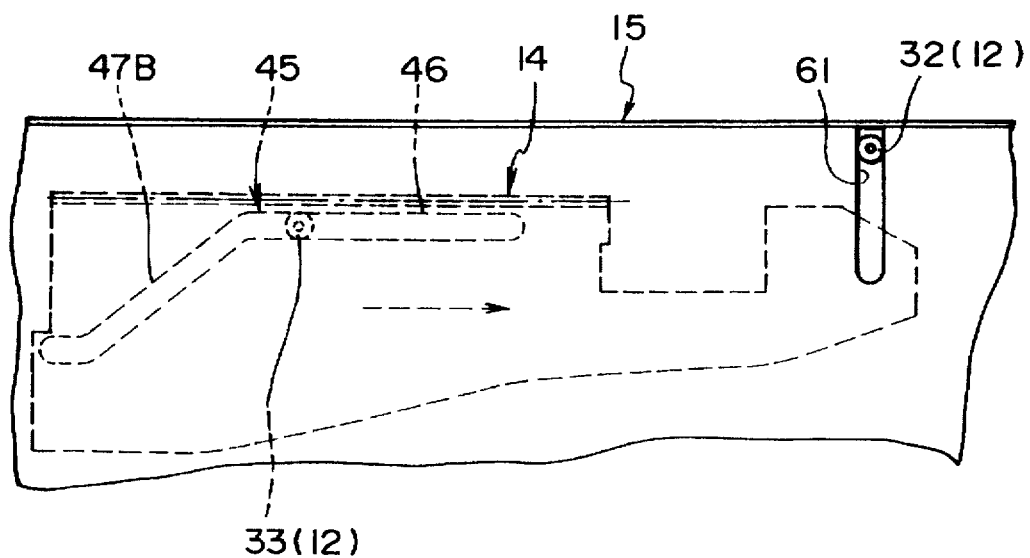
FIG. 12A and 12B are views showing the moving directions of a guide pin 32 and a slide pin 33 of the MG drive plate 12.
Figure 12B:
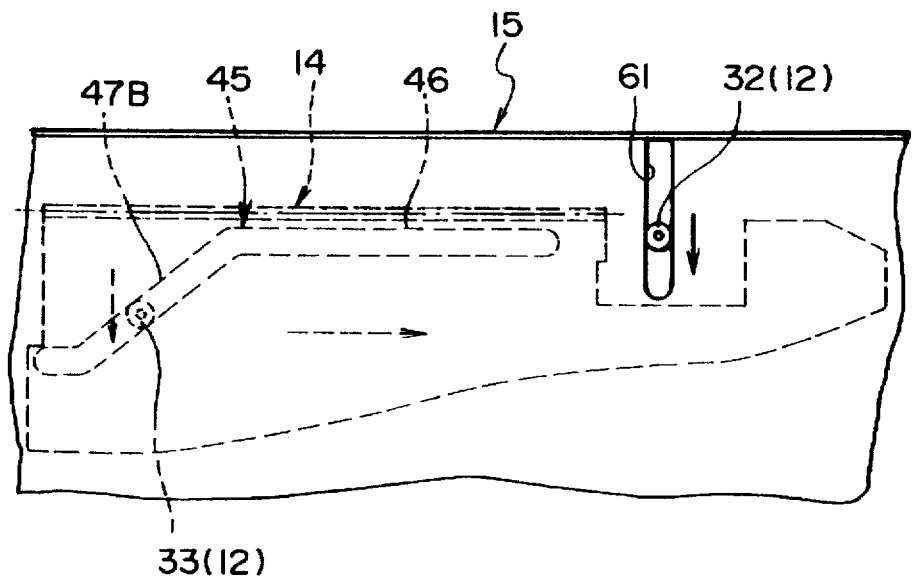

While the slide pins 33 of the MG drive plate 12 are situated in the upper horizontal portions 46 of the respective guide grooves 45 of the cam plates 14, as shown in FIG. 12A, the MG drive plate 12 is held in its upper limit position even if the cam plates 14 are moved. After the slide pins 33 reach the respective inclined portions 47B with movement of the cam plates 14, as shown in FIG. 12B, the MG drive plate 12 lowers as the cam plates 14 move. At this time, since the moving direction of the guide pins 32 of the MG drive plate 12 is restricted by the vertically elongate holes 61, the MG drive plate 12 lowers exactly vertically.

Figure 21:
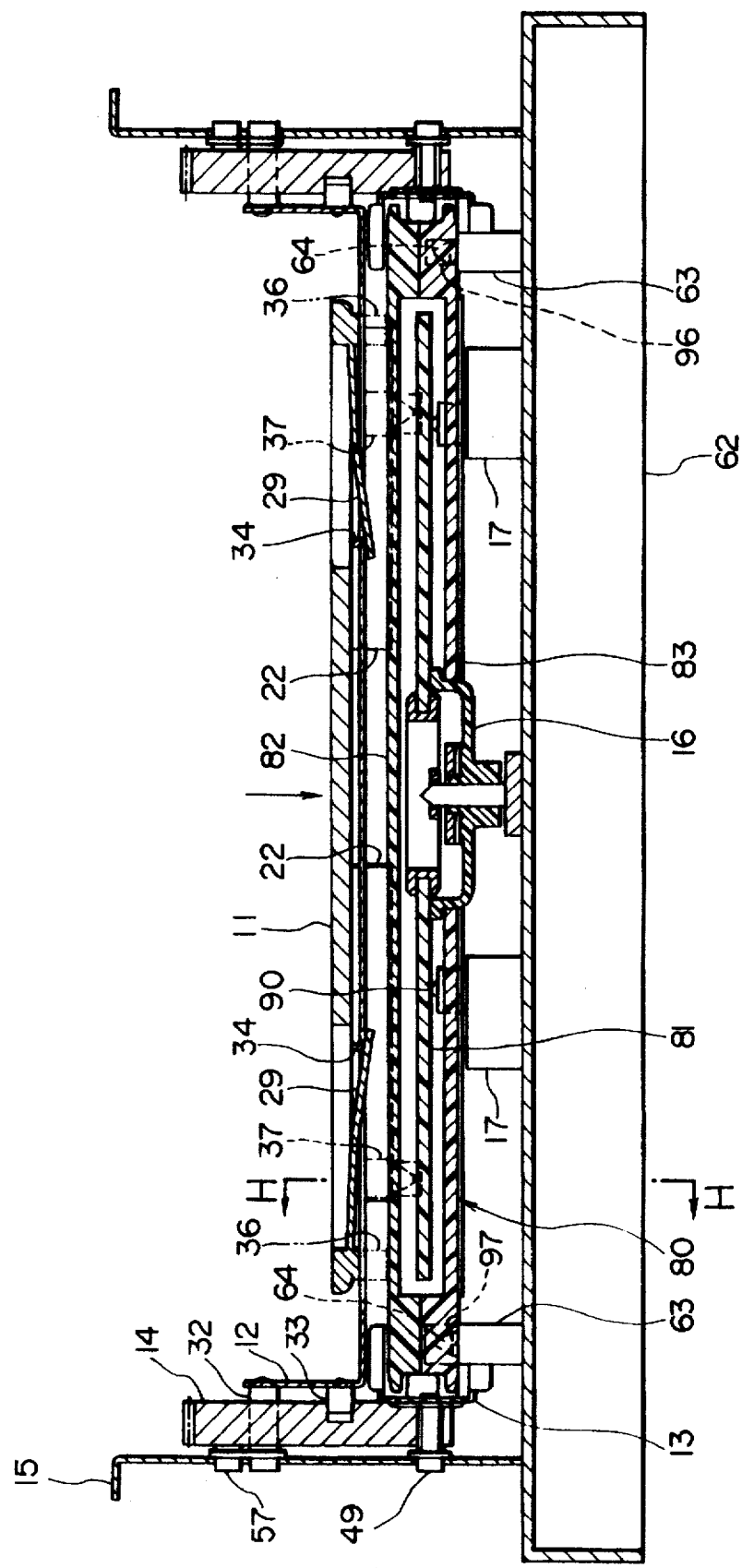
FIG. 21 is a view showing a state in which the MO disc cartridge 2 and an auxiliary magnetic field are lowered.
Figure 22:
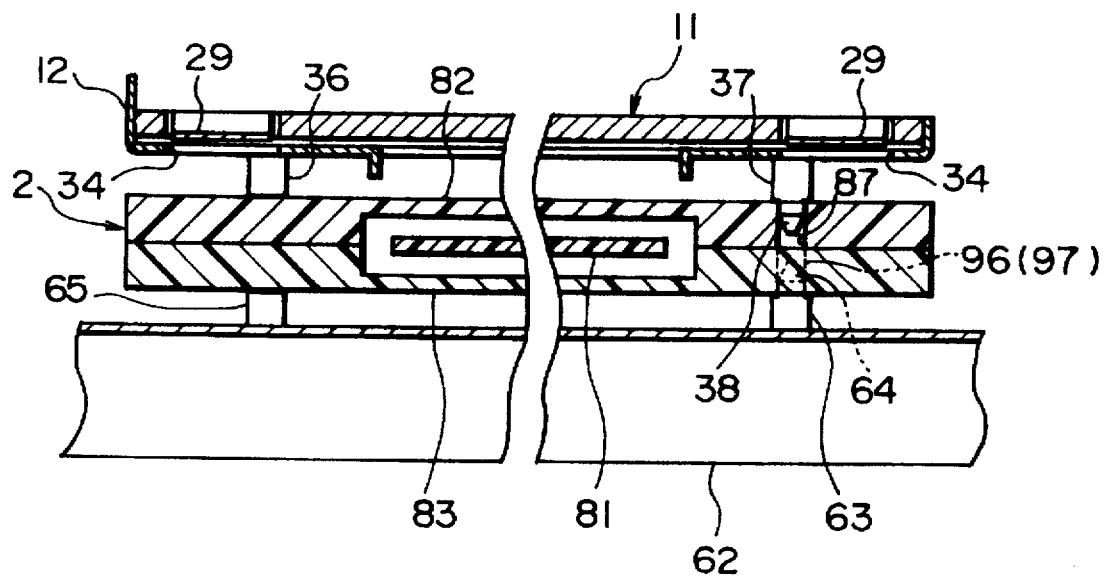
FIG. 22 is a sectional view taken along line H—H in FIG. 21.

Subsequently, the tray 13 and the MG drive plate 12 descend simultaneously, as shown in FIG. 21, and the protuberances 64 at the distal ends of the positioning pins 63 are inserted into the positioning hole 96 and the positioning elongate hole 97, respectively, formed on the lower case 83 of the MO disc cartridge 2. Since the MO disc cartridge 2 is pushed downward by the catching rollers, the cartridge 2 is accurately positioned with respect to the horizontal and vertical (height) directions as shown in FIG. 22, while being prevented from making shaky motion.

Further, at this time, the protuberances 38 of the horizontal positioning pins 37 of the MG chassis 11 mounted to the MG drive plate 12 are inserted into the respective auxiliary magnetic field positioning holes 87 formed in the upper case 82 of the MO disc cartridge 2. Simultaneously, the vertical positioning pins 36 of the MG chassis 11 are brought into contact with the upper surface of the upper case 82. Consequently, the horizontal and vertical positions of the MG chassis 11 can be set with accuracy. In this case, the MG drive plate 12 further descends over a predetermined stroke after the tray 13 has lowered to its lower limit position as shown in FIG. 21. This causes the distal ends of the clamp members 29 of the MG chassis 11 to be pushed downward and thus elastically deformed. The elastic restoring forces exerted by the clamp members 29 in this manner serve to press the MG chassis 11 downward, whereby the permanent magnets 22 mounted on the MG chassis 11 are prevented from making shaky motion and are held stably.

Figure 23:
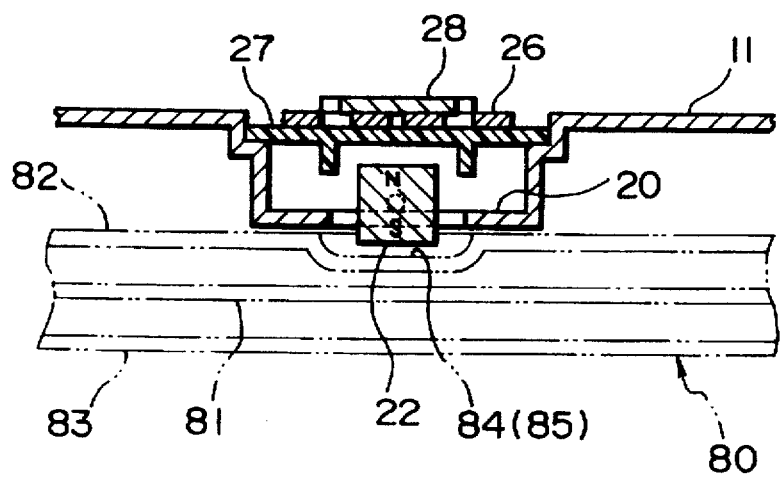
FIG. 23 is a sectional view taken along line J—J in FIG. 3.
Figure 24A:
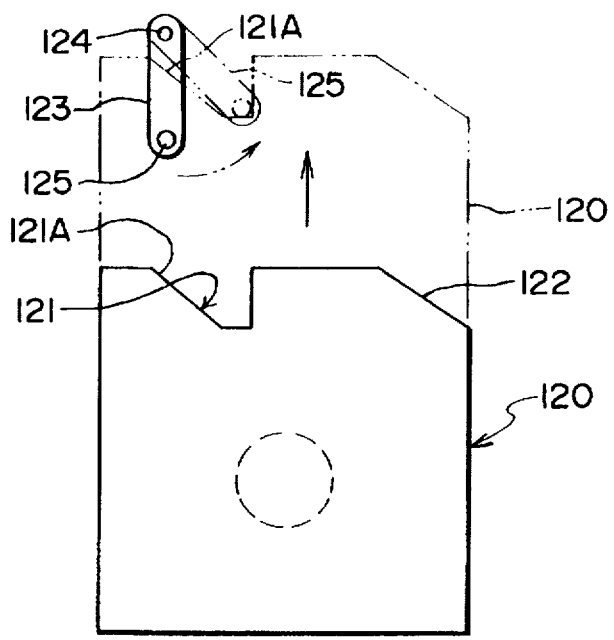
FIG 24A and 24B are views showing a conventional erroneous insertion preventing mechanism.
Figure 24B:
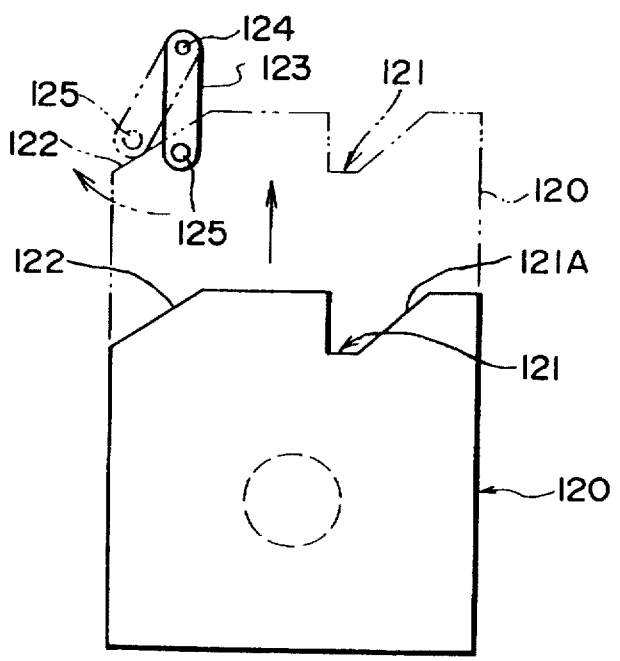

While the MG chassis 11 is held in the lower limit position, the auxiliary magnetic field generating means rotatably mounted to the MG chassis 11, or more specifically, in this embodiment, the permanent magnets 22, are located right above the respective grooves 84 and 85 formed in the upper case 82 of the MO disc cartridge 2 as shown in FIG. 23, and the lower sides thereof are inserted into the respective grooves when necessary. In this case, the gap between each permanent magnet 22 and a corresponding one of the grooves 84 and 85 is large enough to permit rotation of the magnet 22. Thus, the permanent magnets 22 can be brought to a position as close to the MO disc 81 as possible, and the auxiliary magnetic fields effectively act upon the magnetic recording material of the MO disc 81. This permits the permanent magnets 22 to be reduced in size, and thus the magnetic poles can be rotated at high speed, whereby high transfer rate can be achieved.

In the above description of the embodiment, two erroneous insertion preventing grooves 86 and two protuberances 100 are provided, but the number of the grooves and protuberances may at least be one each.

As described above, the recording and/or reproducing apparatus of the present invention using a recording medium housed in a cartridge is characterized in that the protuberances are formed so as to be inserted in the respective erroneous insertion preventing grooves which are formed in the upper or lower surface of the cartridge body at a leading end thereof with respect to the inserting direction.

Also, the cartridge of the present invention for housing a recording medium used in a recording and/or reproducing apparatus is characterized in that the grooves are formed in the upper or lower surface of the cartridge body at a leading end thereof with respect to the inserting direction, so as to receive the erroneous insertion preventing protuberances of the recording and/or reproducing apparatus.

Therefore, according to the present invention, erroneous insertion of the cartridge can be reliably prevented with a simple structure, whereby the cost can be cut down and also the reliability is enhanced because damage to the optical pickups and the like can be prevented. Another advantage is that the shutters can be prevented from being damaged.

What is claimed is:

1. A recording and/or reproducing apparatus for a disc cartridge, comprising:

a movable cartridge tray for causing the disc cartridge to move between an insertion position and a loading position, said cartridge tray having a protuberance which is inserted in a groove which is formed in one of upper and lower surfaces of the disc cartridge at a leading end thereof with respect to a direction of insertion of the disc cartridge into said cartridge tray;

an optical pickup movable in a radial direction of a disc within the disc cartridge located in the loading position, for reading a signal written on the disc within the disc cartridge; and means for preventing the movable cartridge tray from moving between the insertion position and the loading position if the protuberance is not fully inserted into the groove and thereby preventing the optical pickup from colliding with a side of the disc cartridge which is not provided with a shutter.

2. A recording and/or reproducing apparatus according to claim 1, wherein said protuberance includes a plurality of protuberances located corresponding to a plurality of grooves of the disc cartridge.

3. A recording and/or reproducing apparatus according to claim 2, wherein said optical pickup is located at a lower level than the disc cartridge located in the insertion position.

* * * * *